United States Patent
Wang

(10) Patent No.: US 10,625,616 B2
(45) Date of Patent: Apr. 21, 2020

(54) ELECTRIC VEHICLE AND VEHICLE-MOUNTED CHARGER, AND METHOD FOR CONTROLLING THE SAME

(71) Applicant: BYD COMPANY LIMITED, Shenzhen (CN)

(72) Inventor: Xinghui Wang, Shenzhen (CN)

(73) Assignee: BYD COMPANY LIMITED, Shenzhen (CN)

(*) Notice: Subject to any disclaimer, the term of this patent is extended or adjusted under 35 U.S.C. 154(b) by 146 days.

(21) Appl. No.: 16/062,383

(22) PCT Filed: Dec. 16, 2016

(86) PCT No.: PCT/CN2016/110269
§ 371 (c)(1),
(2) Date: Jun. 14, 2018

(87) PCT Pub. No.: WO2017/101836
PCT Pub. Date: Jun. 22, 2017

(65) Prior Publication Data
US 2018/0370381 A1   Dec. 27, 2018

(30) Foreign Application Priority Data
Dec. 18, 2015 (CN) .......................... 2015 1 0956679

(51) Int. Cl.
*H02J 7/00*        (2006.01)
*H02J 7/14*        (2006.01)
(Continued)

(52) U.S. Cl.
CPC .......... *B60L 11/1851* (2013.01); *B60L 53/14* (2019.02); *B60L 53/22* (2019.02); *B60L 53/60* (2019.02);
(Continued)

(58) Field of Classification Search
USPC ........................................ 320/109, 107, 108
See application file for complete search history.

(56) References Cited

U.S. PATENT DOCUMENTS 5,686,812 A    11/1997  Hotta
8,610,400 B2 * 12/2013  Stevens ................ H04B 5/0037
                                              320/108
(Continued)

FOREIGN PATENT DOCUMENTS

CN      101604923 A      12/2009
CN      103986377 A       8/2014
(Continued)

OTHER PUBLICATIONS

The World Intellectual Property Organization (WIPO) International Search Report and Written Opinion for PCT/CN2016/110269 dated Mar. 22, 2017 7 Pages.

*Primary Examiner* — Alexis B Pacheco
(74) *Attorney, Agent, or Firm* — Anova Law Group, PLLC

(57) ABSTRACT

The present disclosure provides an electric vehicle, a vehicle-mounted charger and a method for controlling the same. The method includes: obtaining a first total discharging time for controlling the H bridge in a first manner and a second total discharging time for controlling the H bridge in a second manner when a power battery discharges via the vehicle-mounted charger; obtaining a first discharging predetermined time for controlling the H bridge in the first manner and a second discharging predetermined time for controlling the H bridge in the second manner; selecting a manner for controlling the H bridge according to a relation between the first total discharging time and the second total discharging time; and performing an alternate control on the H bridge in the first manner or the second manner according (Continued)

to the first discharging predetermined time and the second discharging predetermined time.

17 Claims, 8 Drawing Sheets

(51) Int. Cl.
| | |
|---|---|
| *B60L 11/18* | (2006.01) |
| *H02M 7/5395* | (2006.01) |
| *H02M 7/5387* | (2007.01) |
| *H02M 7/793* | (2006.01) |
| *B60L 53/60* | (2019.01) |
| *B60L 53/14* | (2019.01) |
| *B60L 58/10* | (2019.01) |
| *B60L 53/22* | (2019.01) |
| *H02M 1/00* | (2006.01) |
| *H02M 1/32* | (2007.01) |
| *H02M 7/219* | (2006.01) |

(52) U.S. Cl.
CPC ........... *B60L 58/10* (2019.02); *H02M 7/5387* (2013.01); *H02M 7/5395* (2013.01); *H02M 7/793* (2013.01); *B60L 2210/30* (2013.01); *H02M 2001/0054* (2013.01); *H02M 2001/327* (2013.01); *H02M 2007/2195* (2013.01); *Y02T 10/705* (2013.01); *Y02T 10/7005* (2013.01); *Y02T 10/7072* (2013.01); *Y02T 10/7241* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/163* (2013.01)

(56) References Cited

U.S. PATENT DOCUMENTS

| | | | | |
|---|---|---|---|---|
| 8,751,085 | B2 * | 6/2014 | Major | G06F 17/00 701/22 |
| 8,810,060 | B2 * | 8/2014 | Kamaga | B60L 53/24 307/9.1 |
| 8,862,414 | B2 * | 10/2014 | LePort | H01M 10/486 340/438 |
| 9,178,379 | B2 * | 11/2015 | Choi | B60L 53/305 |
| 9,276,426 | B2 * | 3/2016 | Kim | H02J 7/0055 |
| 9,428,173 | B2 * | 8/2016 | Stefanon | B60W 10/26 |
| 9,623,761 | B2 * | 4/2017 | Gale | B60L 3/0046 |

FOREIGN PATENT DOCUMENTS

| | | |
|---|---|---|
| CN | 104600998 A | 5/2015 |
| CN | 105098868 A | 11/2015 |
| CN | 204835609 U | 12/2015 |

\* cited by examiner

ELECTRIC VEHICLE AND VEHICLE-MOUNTED CHARGER, AND METHOD FOR CONTROLLING THE SAME

CROSS-REFERENCE TO RELATED APPLICATION

The present application is based on and claims priority to Chinese Patent Application Serial No. 201510956679.6 filed on Dec. 18, 2015, all content of which is hereby incorporated by reference in its entity.

FIELD

The present disclosure relates to the technical field of electric vehicles and, in particular, to a method for controlling a vehicle-mounted charger of an electric vehicle, a vehicle-mounted charger of an electric vehicle, and an electric vehicle.

BACKGROUND

Along with the commercialization progress of electric vehicles, a vehicle-mounted charger of the electric vehicles has become one of important components in the electric vehicles.

There are many methods for outwardly discharging from the whole vehicle via the vehicle-mounted charger. A monophase H bridge off-grid conversion control method is mostly adopted in related arts, which includes a dual-polarity control method and a mono-polarity control method.

However, when the dual-polarity control method is adopted, four switch transistors in an H bridge are all in a high frequency ON/OFF state, resulting in higher switching loss and larger heat loss. When the mono-polarity control method is adopted, although the heat loss of the switch transistors that is generated when the dual-polarity control method is adopted can be solved to some extent, the four switch transistors in the H bridge are controlled according to a fixed manner during a charging process or a discharging process of the whole vehicle, some switch transistors in the H bridge need to be switched off with current. The overheat problems of the switch transistors switched off with current are not effectively solved.

Therefore, regardless of whether the dual-polarity control method or the mono-polarity control method is adopted, the heating problems of the switch transistors in the H bridge cannot be effectively solved, and the service life of the switch transistors is affected.

SUMMARY

The present disclosure aims to solve at least one of the technical problems in the related art to some extent. For this purpose, a first objective of the present disclosure is to provide a method for controlling a vehicle-mounted charger of an electric vehicle, which is capable of enabling heating of a first switch transistor, a second switch transistor, a third switch transistor and a fourth switch transistor in an H bridge to be relatively balanced, and improving a service life of the switch transistors in the H bridge.

A second objective of the present disclosure is to provide a vehicle-mounted charger of an electric vehicle. A third objective of the present disclosure is to provide an electric vehicle.

For the above purposes, in one aspect of embodiments of the present disclosure, there is provided a method for controlling a vehicle-mounted charger of an electric vehicle. The vehicle-mounted charger includes an H bridge. The H bridge includes a first switch transistor, a second switch transistor, a third switch transistor and a fourth switch transistor. The method includes: obtaining a first total discharging time for controlling the H bridge in a first manner and a second total discharging time for controlling the H bridge in a second manner when a power battery starts to discharge via the vehicle-mounted charger; obtaining a first discharging predetermined time for controlling the H bridge in the first manner and a second discharging predetermined time for controlling the H bridge in the second manner; selecting a manner for controlling the H bridge according to a relation between the first total discharging time and the second total discharging time; and performing an alternate control on the H bridge in the first manner or the second manner according to the first discharging predetermined time and the second discharging predetermined time to perform temperature balanced control over the first switch transistor, the second switch transistor, the third switch transistor and the fourth switch transistor; in which the first discharging predetermined time and the second discharging predetermined time are preset for each discharging cycle of a discharging process of the power battery.

According to the method for controlling a vehicle-mounted charger of an electric vehicle in embodiments of the present disclosure, every time when the power battery discharges via the vehicle-mounted charger, the first total discharging time for controlling the H bridge in the first manner and the second total discharging time for controlling the H bridge in the second manner are obtained, and the first discharging predetermined time for controlling the H bridge in the first manner and the second discharging predetermined time for controlling the H bridge in the second manner are also obtained; and the manner for controlling the H bridge is selected according to the relation between the first total discharging time and the second total discharging time; finally, the alternate control on the H bridge in the first manner or the second manner is performed according to the first discharging predetermined time and the second discharging predetermined time, so as to perform the temperature balanced control over the first switch transistor, the second switch transistor, the third switch transistor and the fourth switch transistor, such that the heating of each switch transistor is relatively balanced, the service life of the switch transistors in the H bridge is prolonged, and thus the service time is prolonged.

For the above purposes, in another aspect of embodiments of the present disclosure, there is provided a vehicle-mounted charger of an electric vehicle. The vehicle-mounted charger includes: an H bridge including a first switch transistor, a second switch transistor, a third switch transistor and a fourth switch transistor; and a controller, configured to obtain a first total discharging time for controlling the H bridge in a first manner and a second total discharging time for controlling the H bridge in a second manner when the power battery starts to discharge via the vehicle-mounted charger; to obtain a first discharging predetermined time for controlling the H bridge in the first manner and a second discharging predetermined time for controlling the H bridge in the second manner; to select a manner for controlling the H bridge according to a relation between the first total discharging time and the second total discharging time; and to perform an alternate control on the H bridge in the first manner or the second manner according to the first discharging predetermined time and the second discharging predetermined time to perform temperature balanced control over the first switch transistor, the second switch transistor, the third switch transistor and the fourth switch transistor, in which the first discharging predetermined time and the second discharging predetermined time are preset for each discharging cycle of a discharging process of the power battery.

According to the vehicle-mounted charger of an electric vehicle in embodiments of the present disclosure, every time when the power battery discharges via the vehicle-mounted charger, the controller is configured to obtain the first total discharging time for controlling the H bridge in the first manner and the second total discharging time for controlling the H bridge in the second manner, to obtain the first discharging predetermined time for controlling the H bridge in the first manner and the second discharging predetermined time for controlling the H bridge in the second manner; and to select the manner for controlling the H bridge according to the relation between the first total discharging time and the second total discharging time, finally, to perform the alternate control on the H bridge in the first manner or the second manner according to the first discharging predetermined time and the second discharging predetermined time, so as to perform the temperature balanced control over the first switch transistor, the second switch transistor, the third switch transistor and the fourth switch transistor, such that the heating of each switch transistor is relatively balanced, the service life of the switch transistors in the H bridge is prolonged, and thus the service time is prolonged.

In addition, an embodiment of the present disclosure also provides an electric vehicle, including the vehicle-mounted charger.

According to the electric vehicle in embodiments of the present disclosure, when the power battery discharges via the vehicle-mounted charger, the temperature balanced control over the first switch transistor, the second switch transistor, the third switch transistor and the fourth switch transistor in the H bridge can be realized. As such, the heating of each switch transistor is balanced, the service life of the switch transistors in the H bridge is prolonged, and the service time of the vehicle-mounted charger is prolonged.

DETAILED DESCRIPTION

Figure 1:
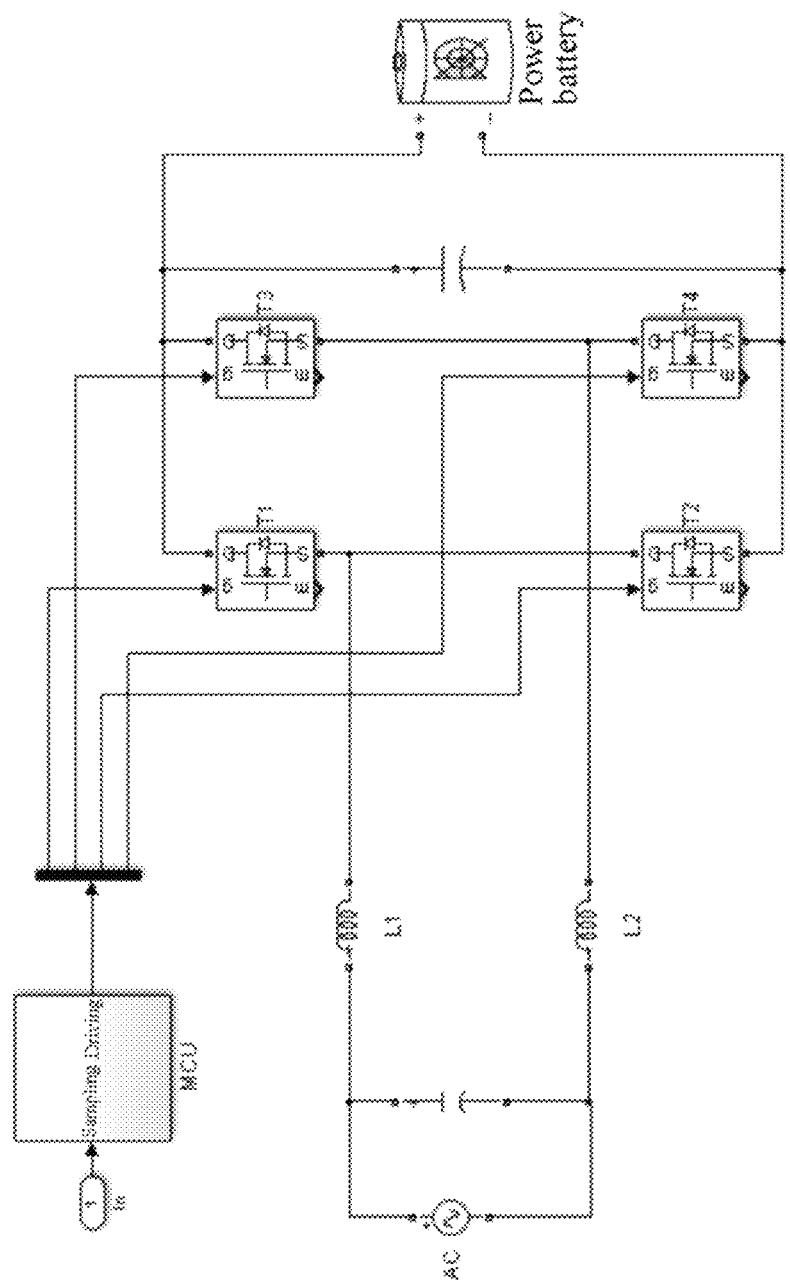
FIG. 1 is a circuit schematic diagram of a vehicle-mounted charger of an electric vehicle according to an embodiment of the present disclosure.

The embodiments of the present disclosure are described in detail, examples of the embodiments are shown in the drawings, wherein, the same or similar numbers represent same or similar elements or elements having the same or similar functions from beginning to end. The embodiments described with reference to the drawings are exemplary, and aimed to explain the present disclosure rather than understood as a limitation to the present disclosure.

The method for controlling a vehicle-mounted charger of an electric vehicle, a vehicle-mounted charger of an electric vehicle, and an electric vehicle with the vehicle-mounted charger, provided according to embodiments of the present disclosure, are described with reference to the drawings as follows.

Figure 2:
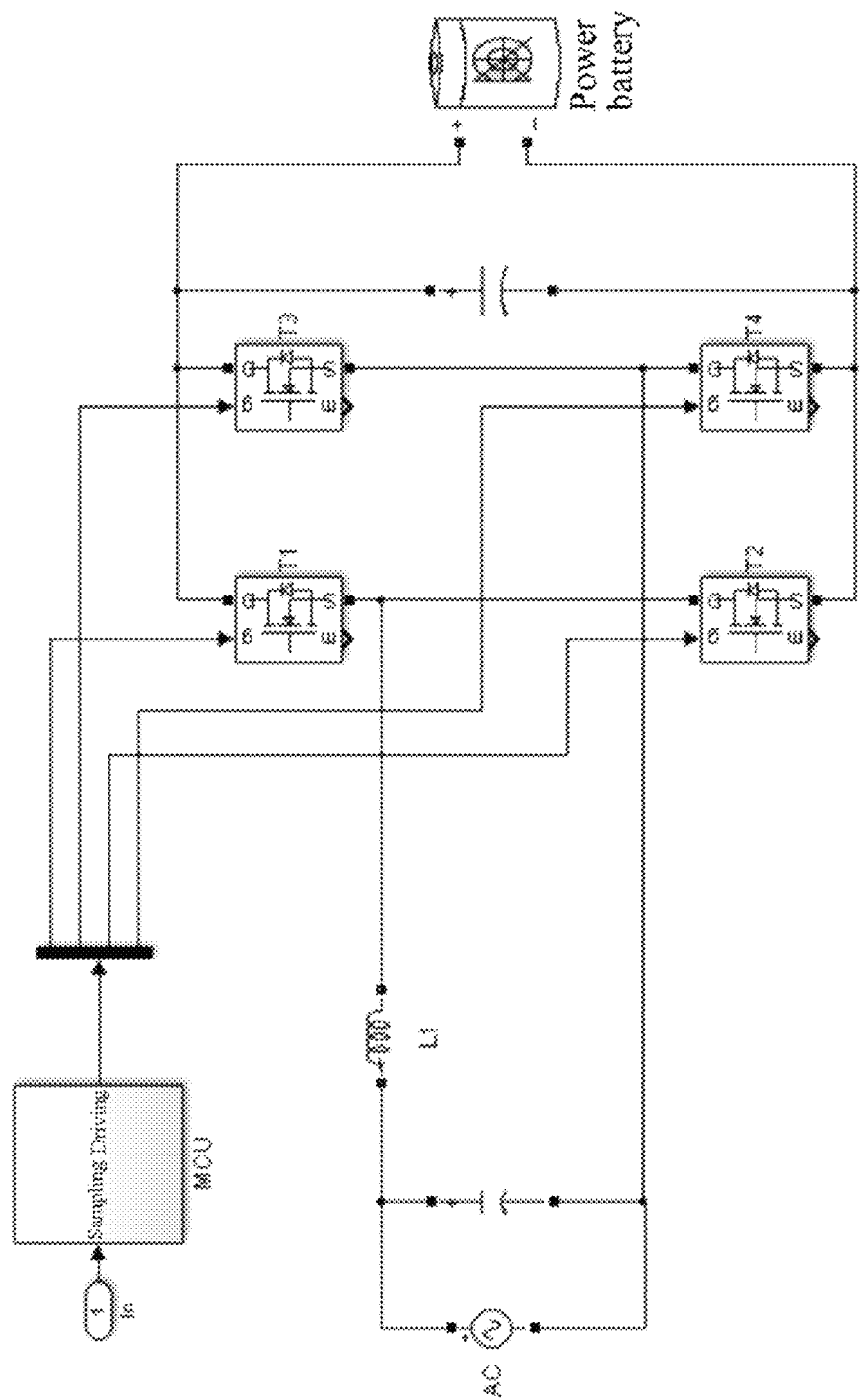
FIG. 2 is a circuit schematic diagram of a vehicle-mounted charger of an electric vehicle according to another embodiment of the present disclosure.
Figure 3:
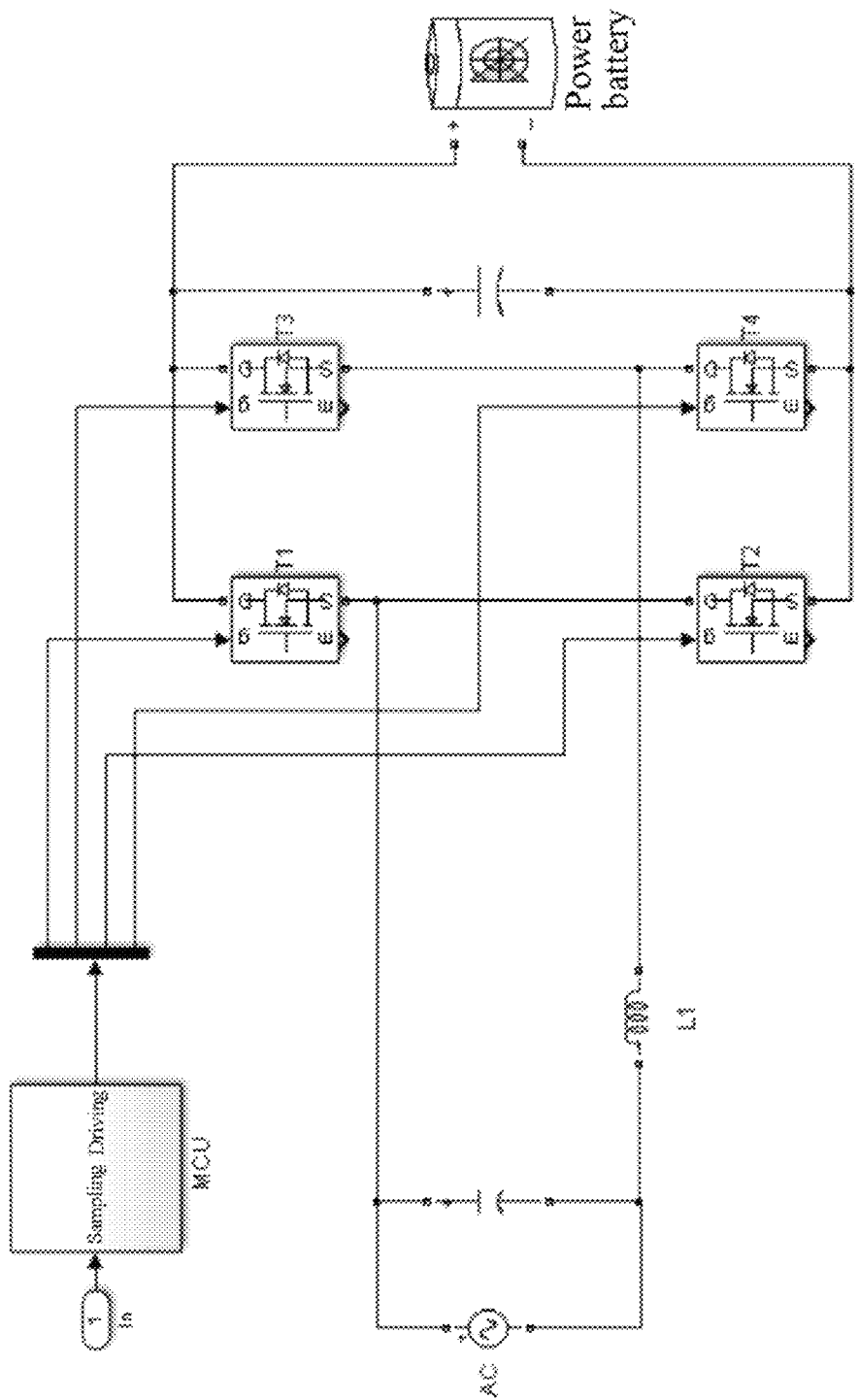
FIG. 3 is a circuit schematic diagram of a vehicle-mounted charger of an electric vehicle according to another embodiment of the present disclosure.

FIGS. 1 to 3 show a connecting manner of a vehicle-mounted charger of an electric vehicle according to an embodiment of the present disclosure. As shown in FIGS. 1 to 3, the vehicle-mounted charger of an electric vehicle according to embodiments of the present disclosure includes an H bridge. The H bridge includes a first switch transistor T1, a second switch transistor T2, a third switch transistor T3 and a fourth switch transistor T4. The vehicle-mounted charger of an electric vehicle as shown in FIG. 1 includes a first inductor L1 and a second inductor L2, in which a first end of the first inductor L1 is connected to one end of a load or an anode end of an alternating current power grid AC, and a first end of the second inductor L2 is connected to the other end of the load or a cathode end of the alternating current power grid AC, and a second end of the first inductor L1 and a second end of the second inductor L2 are connected to the H bridge. The vehicle-mounted charger of an electric vehicle as shown in FIG. 2 merely includes an inductor, for example, the inductor L1, in which a first end of the first inductor L1 is connected to one end of a load or an anode end of an alternating current power grid AC, and a second end of the first inductor L1 is connected to the H bridge. The vehicle-mounted charger of an electric vehicle as shown in FIG. 3 merely includes an inductor, for example, the first inductor L1, in which a first end of the first inductor L1 is connected to the other end of the load or a cathode end of the alternating current power grid AC, and a second end of the first inductor L1 is connected to the H bridge.

Figure 4:
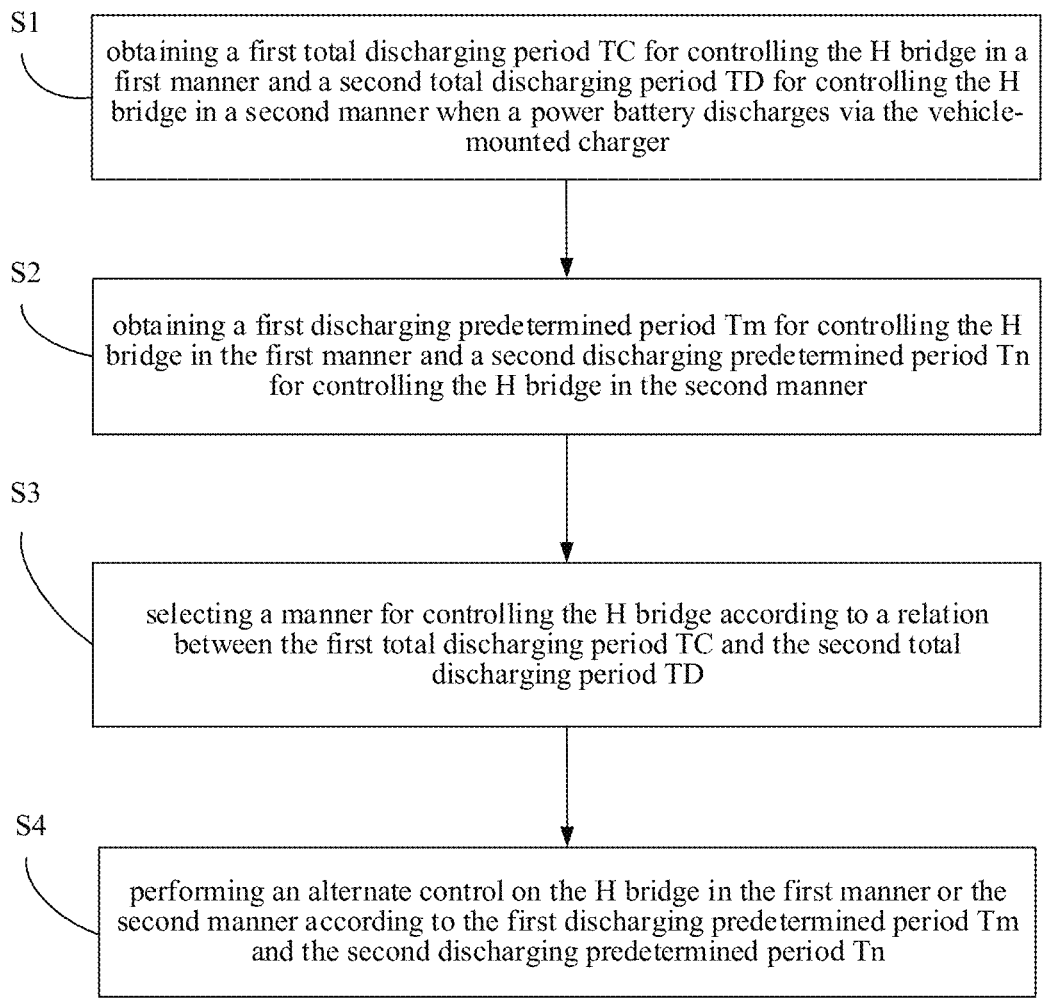
FIG. 4 is a flow chart of a method for controlling a vehicle-mounted charger of an electric vehicle according to an embodiment of the present disclosure.

FIG. 4 is a flow chart of a method for controlling a vehicle-mounted charger of an electric vehicle according to an embodiment of the present disclosure. As shown in FIG. 4, the method for controlling a vehicle-mounted charger of an electric vehicle according to an embodiment of the present disclosure includes followings.

At step S1, a first total discharging time TC for controlling the H bridge in a first manner and a second total discharging time TD for controlling the H bridge in a second manner are obtained, when the power battery of the electric vehicle discharges via the vehicle-mounted charger.

Figure 6:
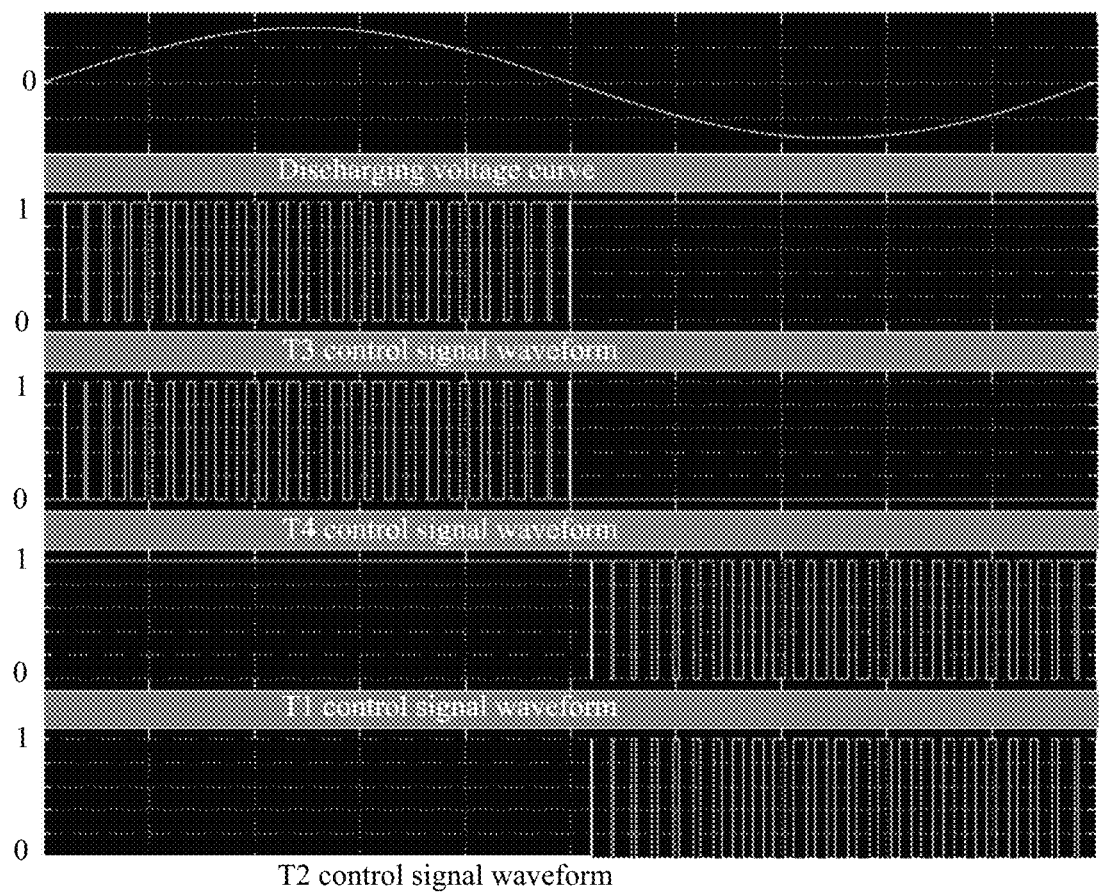
FIG. 6 is a schematic diagram of a control waveform of four switch transistors when an H bridge is controlled by using a first manner to enable a power battery to outwardly discharge according to an embodiment of the present disclosure.

According to an embodiment of the present disclosure, as shown in FIG. 6, if the H bridge is controlled in the first manner A, and when an outwardly discharging transient voltage value of the vehicle-mounted charger is larger than 0, the first switch transistor T1 is controlled to be ON, the second switch transistor T2 is controlled to be OFF, and the third switch transistor T3 and the fourth switch transistor T4 are controlled to be ON and OFF complementarily and alternately. When the third switch transistor T3 and the fourth switch transistor T4 are controlled to be ON and OFF alternately and complementarily, the PWM waveform of the third switch transistor T3 and the PWM waveform of the fourth switch transistor T4 are controlled to be complementary with each other, and a duty ratio of the PWM waveform of the third switch transistor T3 is controlled from large to small and then to large, and a duty ratio of the PWM waveform of the fourth switch transistor T4 is controlled from small to large and then to small; when the outwardly discharging transient voltage value of the vehicle-mounted charger is smaller than 0, the third switch transistor T3 is controlled to be ON, the fourth switch transistor T4 is controlled to be OFF, and the first switch transistor T1 and the second switch transistor T2 are controlled to be ON and OFF complementarily and alternately. When the first switch transistor T1 and the second switch transistor T2 are controlled to be ON and OFF alternately and complementarily, the PWM waveform of the first switch transistor T1 and the PWM waveform of the second switch transistor T2 are controlled to be complementary with each other, and a duty ratio of the PWM waveform of the first switch transistor T1 is controlled from large to small and then to large, and a duty ratio of the PWM waveform of the second switch transistor T2 is controlled from small to large and then to small.

Figure 7:
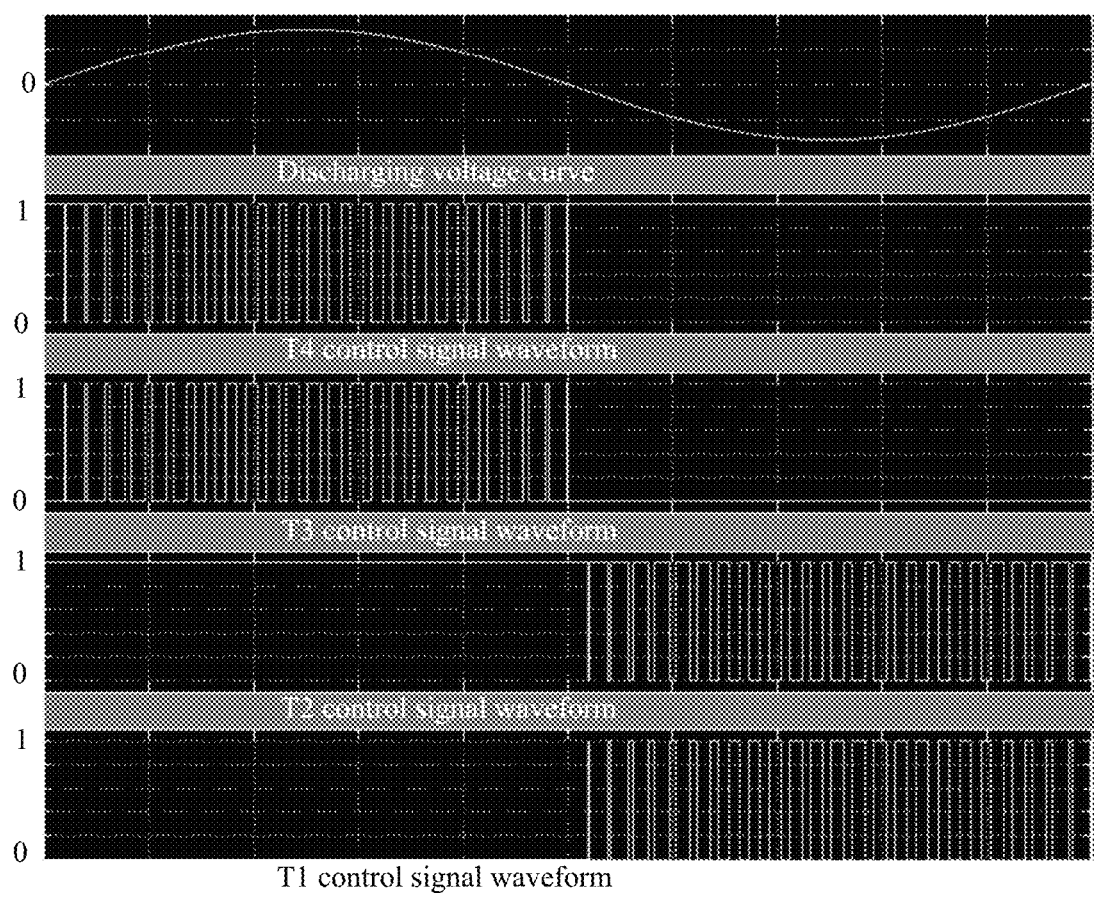
FIG. 7 is a schematic diagram of a control waveform of four switch transistors when an H bridge is controlled by using a second manner to enable a power battery to outwardly discharge according to an embodiment of the present disclosure.

According to an embodiment of the present disclosure, as shown in FIG. 7, if the H bridge is controlled in the second manner B, and when an outwardly discharging transient voltage value of the vehicle-mounted charger is larger than 0, the second switch transistor T2 is controlled to be ON, the first switch transistor T1 is controlled to be OFF, and the third switch transistor T3 and the fourth switch transistor T4 are controlled to be ON and OFF complementarily and alternately. When the third switch transistor T3 and the fourth switch transistor T4 are controlled to be ON and OFF alternately and complementarily, the PWM waveform of the third switch transistor T3 and the PWM waveform of the fourth switch transistor T4 are controlled to be complementary with each other, and a duty ratio of the PWM waveform of the third switch transistor T3 is controlled from small to large and then to small, and a duty ratio of the PWM waveform of the fourth switch transistor T4 is controlled from large to small and then to large; when the outwardly discharging transient voltage value of the vehicle-mounted charger is smaller than 0, the fourth switch transistor T4 is controlled to be ON, the third switch transistor T3 is controlled to be OFF, and the first switch transistor T1 and the second switch transistor T2 are controlled to be ON and OFF complementarily and alternately. When the first switch transistor T1 and the second switch transistor T2 are controlled to be ON and OFF alternately and complementarily, the PWM waveform of the first switch transistor T1 and the PWM waveform of the second switch transistor T2 are controlled to be complementary with each other, and a duty ratio of the PWM waveform of the first switch transistor T1 is controlled from small to large and then to small, and a duty ratio of the PWM waveform of the second switch transistor T2 is controlled from large to small and then to large.

At step S2, a first discharging predetermined time Tm for controlling the H bridge in the first manner and a second discharging predetermined time Tn for controlling the H bridge in the second manner are obtained.

At step S3, a manner for controlling the H bridge is selected according to a relation between the first total discharging time TC and the second total discharging time TD.

At step S4, an alternate control on the H bridge in the first manner or the second manner is performed according to the first discharging predetermined time Tm and the second discharging predetermined time Tn, so as to perform the temperature balanced control over the first switch transistor, the second switch transistor, the third switch transistor and the fourth switch transistor.

In an embodiment of the present disclosure, the first discharging predetermined time Tm and the second discharging predetermined time Tn are preset for each discharging cycle of a discharging process of the power battery.

In the process of discharging from the power battery via the vehicle-mounted charger, if the H bridge is only controlled by using the first manner A, when the outwardly discharging transient voltage value is larger than 0, the first switch transistor T1 is always kept ON, the second switch transistor T2 is always kept OFF, and the third switch transistor T3 and fourth switch transistor T4 are ON and OFF alternately and complementarily, and the inductor in the vehicle-mounted charger is charged when the third switch transistor T3 is OFF and the fourth switch transistor T4 is ON, and discharges when the third switch transistor T3 is ON and the fourth switch transistor T4 is OFF; when the outwardly discharging transient voltage value is smaller than 0, the third switch transistor T3 is always kept ON, the fourth switch transistor T4 is always kept OFF, and the first switch transistor T1 and second switch transistor T2 are ON and OFF alternately and complementarily, and the inductor in the vehicle-mounted charger is charged when the first switch transistor T1 is OFF and the second switch transistor T2 is ON, and discharges when the first switch transistor T1 is ON and the second switch transistor T2 is OFF. Since the inductor is charged when the second switch transistor T2 and the fourth switch transistor T3 are ON, the second switch transistor T2 and the fourth switch transistor T4 are OFF with current, and hard switching is performed, therefore, the second switch transistor T2 and the fourth switch transistor T4 are overheated.

Similarly, in the process of discharging from the power battery via the vehicle-mounted charger, if the H bridge is only controlled by using the second manner B, when the outwardly discharging transient voltage value is larger than 0, the first switch transistor T1 is always kept OFF, the second switch transistor T2 is always kept ON, and the third switch transistor T3 and fourth switch transistor T4 are ON and OFF alternately and complementarily, and the inductor in the vehicle-mounted charger is charged when the fourth switch transistor T4 is OFF and the third switch transistor T3 is ON, and discharges when the fourth switch transistor T4 is ON and the third switch transistor T3 is OFF; when the outwardly discharging transient voltage value is smaller than 0, the fourth switch transistor T4 is always kept ON, the third switch transistor T3 is always kept OFF, and the first switch transistor T1 and second switch transistor T2 are ON and OFF alternately and complementarily, and the inductor in the vehicle-mounted charger is charged when the second switch transistor T2 is OFF and the first switch transistor T1 is ON, and discharges when the second switch transistor T2 is ON and the first switch transistor T1 is OFF. Since the inductor is charged when the first tube T1 and the third tube T3 are ON, the first switch transistor T1 and the third switch transistor T3 are OFF with current, and hard switching is performed, therefore, the first switch transistor T1 and the third switch transistor T3 are overheated.

Therefore, in an embodiment of the present disclosure, when the H bridge is controlled by using the first manner A to enable to discharge from the power battery via the vehicle-mounted charger, the time that the H bridge is controlled in the first manner A is recorded, thus the first total discharging time TC of controlling the H bridge in the first manner A is obtained, and then is stored; when the H bridge is controlled by using the second manner B enable to discharge from the power battery via the vehicle-mounted charger, the time that the H bridge is controlled in the second manner B is recorded, thus the second total discharging time TD of controlling the H bridge in the second manner B is obtained, and then is stored. Then, every time in the process of discharging from the power battery via the vehicle-mounted charger, the relation between the first total discharging time TC and the second total discharging time TD is determined. Finally, the manner of controlling the H bridge is selected when the power battery discharges via the vehicle-mounted charger according to the relation between the first total discharging time TC and the second total discharging time TD, thereby realizing the temperature balanced control over the first switch transistor, the second switch transistor, the third switch transistor and the fourth switch transistor.

Figure 5:
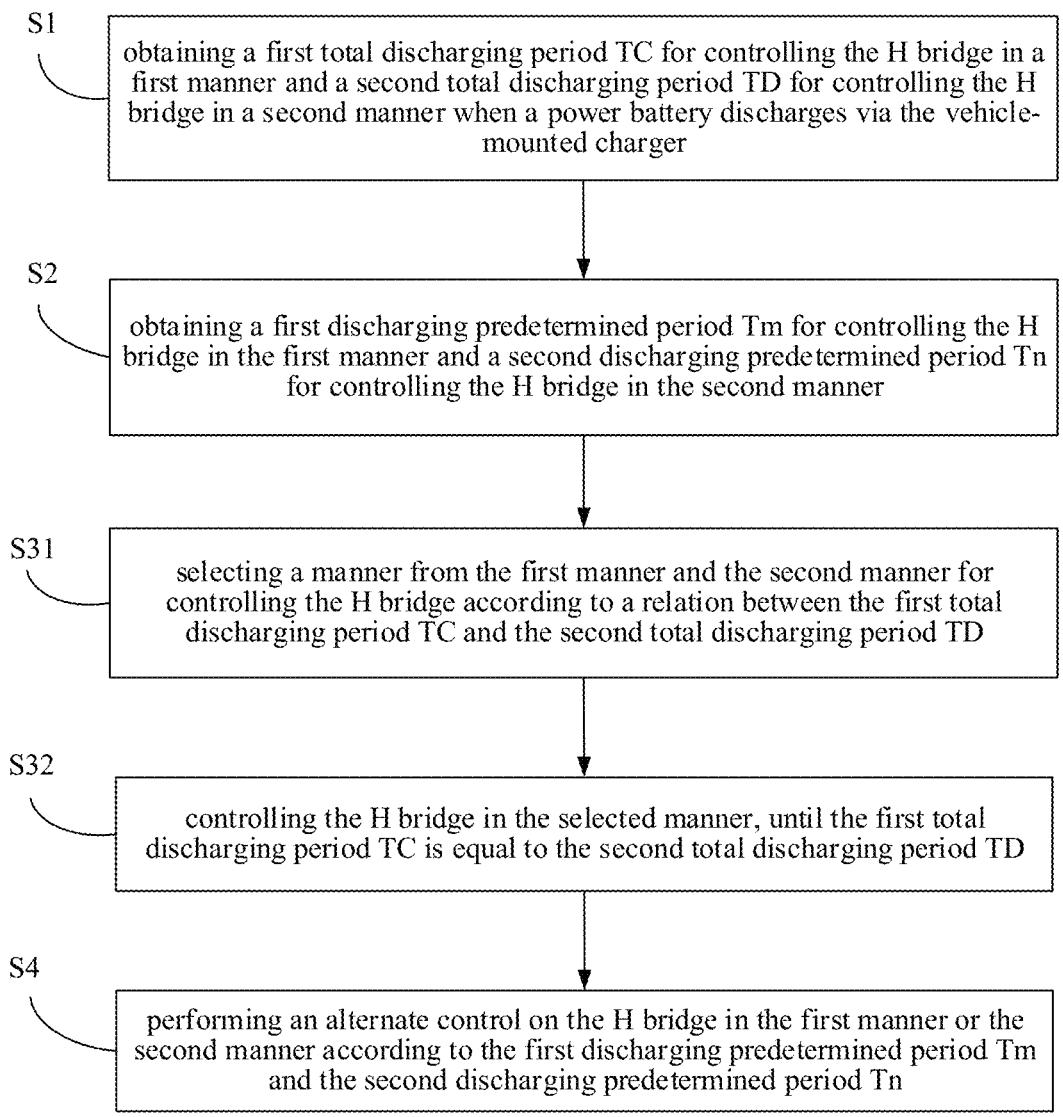
FIG. 5 is a flow chart of a method for controlling a vehicle-mounted charger of an electric vehicle according to another embodiment of the present disclosure.

FIG. 5 is a flow chart of a method for controlling a vehicle-mounted charger of an electric vehicle according to another embodiment of the present disclosure. In an embodiment, as shown in FIG. 5, step S3 further includes followings.

At step S31, the manner from the first manner and the second manner for controlling the H bridge is selected according to the relation between the first total discharging time TC and the second total discharging time TD.

At step S32, the H bridge is controlled in the selected manner, until the first total discharging time TC is equal to the second total discharging time TD.

According to an embodiment of the present disclosure, selecting the manner of controlling the H bridge according to the relation between the first total discharging time TC and the second total discharging time TD includes: if the first total discharging time TC is larger than the second total discharging time TD, the second manner B for controlling the H bridge is selected when the power battery discharges via the vehicle-mounted charger, and then the H bridge is controlled in the second manner B until the first total discharging time TC is equal to the second total discharging time TD, and then the alternate control is performed on the H bridge according to the first discharging predetermined time Tm and the second discharging predetermined time Tn; if the second total discharging time TD is larger than the first total discharging time TC, the first manner A for controlling the H bridge is selected when the power battery discharges via the vehicle-mounted charger, and then the H bridge is controlled in the first manner A until the first total discharging time TC is equal to the second total discharging time TD, and then the alternate control is performed on the H bridge according to the first discharging predetermined time Tm and the second discharging predetermined time Tn; and if the first total discharging time TC is equal to the second total discharging time TD, the first manner A or second manner B for controlling the H bridge is selected when the power battery discharges via the vehicle-mounted charger, and then the alternate control is performed on the H bridge according to the first discharging predetermined time Tm and the second discharging predetermined time Tn when the power battery discharges via the vehicle-mounted charger In an embodiment, the alternate control on the H bridge is performed according to the first discharging predetermined time Tm and the second discharging predetermined time Tn when the power battery discharges via the vehicle-mounted charger includes: when a time of controlling the H bridge in the first manner A reaches the first discharging predetermined time Tm, the H bridge in the second manner B is controlled till a time of controlling the H bridge in the second manner B reaches the second discharging predetermined time Tn; or when a time of controlling the H bridge in the second manner B reaches the second discharging predetermined time Tn, the H bridge in the first manner A is controlled till a time of controlling the H bridge in the first manner A reaches the first discharging predetermined time Tm.

For example, before the power battery discharges via the vehicle-mounted charger, the first total discharging time TC that the H bridge is controlled in the first manner A as well as the second total discharging time TD that the H bridge is controlled in the second manner B are obtained from a storage region. And the first discharging predetermined time Tm and the second discharging predetermined time Tn are preset. Then the relation between the first total discharging time TC and the second total discharging time TD is determined, the first manner A for controlling the H bridge firstly or the second manner B for controlling the H bridge firstly is determined according the relation. In other words, the first total discharging time TC and the second total discharging time TD are obtained from the storage region, an aim to determine the relation between the first total discharging time TC and the second total discharging time TD is to determine the selected manner for controlling the H bridge firstly when the power battery discharges via the vehicle-mounted charger.

For example, if the obtained time TC is 20 minutes and the obtained time TD is 18 minutes, when the power battery discharges via the vehicle-mounted charger, firstly the H bridge is controlled by selecting the second manner B because the obtained time TC is greater than the obtained time TD, so as to enable to discharge from the power battery via the vehicle-mounted charger. After 2 minutes, the H bridge is switched to be controlled by using the first manner A, so as to discharge from the power battery via the vehicle-mounted charger till the time that the H bridge is controlled in the first manner A reaches Tm, then the H bridge is switched to be controlled by using the second manner B till the time that the H bridge is controlled in the second manner B reaches Tn, thereby finishing one discharging cycle (i.e., the time of one discharging cycle equals to Tm+Tn); then the H bridge is switched to be controlled by using the first manner A to enable to discharge from the power battery via the vehicle-mounted charger till the time that the H bridge is controlled by using the first manner A reaches Tm, then the H bridge is switched to be controlled by using the second manner B to enable to discharge from the power battery via the vehicle-mounted charger till the time that the H bridge is controlled by using the second manner B reaches Tn, . . . , and the like, thereby realizing the alternative control over the H bridge, and further performing the temperature balanced control over the first switch transistor, the second switch transistor, the third switch transistor and the fourth switch transistor.

If the obtained time TC is 18 minutes and the obtained time TD is 20 minutes, when the power battery discharges via the vehicle-mounted charger, firstly the H bridge is controlled by selecting the first manner A because the obtained time TD is greater than the obtained time TC, so as to enable to discharge from the power battery via the vehicle-mounted charger. After 2 minutes, the H bridge is switched to be controlled by using the second manner B, so as to discharge from the power battery via the vehicle-mounted charger till the time that the H bridge is controlled by the second manner B reaches Tn, then the H bridge is switched to be controlled by using the first manner A till the time that the H bridge is controlled by the first manner A reaches Tm, thereby finishing one discharging cycle (i.e., the time of one discharging cycle equals to Tm+Tn); then the H bridge is switched to be controlled by using the second manner B to enable to discharge from the power battery via the vehicle-mounted charger till the time that the H bridge is controlled by using the second manner B reaches Tn, then the H bridge is switched to be controlled by using the first manner A to enable to discharge from the power battery via the vehicle-mounted charger till the time that the H bridge is controlled by using the first manner A reaches Tm, . . . , and the like, thereby realizing the alternative control over the H bridge, and further performing the temperature balanced control over the first switch transistor, the second switch transistor, the third switch transistor and the fourth switch transistor.

Furthermore, if the obtained time TC is equal to the obtained time TD, when the power battery discharges via the vehicle-mounted charger, firstly the H bridge can be controlled by selecting the first manner A to enable to discharge from the power battery via the vehicle-mounted charger till the time that the H bridge is controlled in the first manner A reaches Tm, then the H bridge is switched to be controlled by using the second manner B till the time that the H bridge is controlled in the second manner B reaches Tn, thereby finishing one discharging cycle (i.e., the time of one discharging cycle equals to Tm+Tn); then the H bridge is switched to be controlled by using the first manner A to enable to discharge from the power battery via the vehicle-mounted charger till the time that the H bridge is controlled by using the first manner A reaches Tm, then the H bridge is switched to be controlled by using the second manner B to enable to discharge from the power battery via the vehicle-mounted charger till the time that the H bridge is controlled by using the second manner B reaches Tn, . . . , and the like, thereby realizing the alternative control over the H bridge, and further performing the temperature balanced control over the first switch transistor, the second switch transistor, the third switch transistor and the fourth switch transistor. Or, if the obtained TC is equal to the obtained TD, when the power battery discharges via the vehicle-mounted charger, firstly the H bridge can be controlled by selecting the second manner B to enable to discharge from the power battery via the vehicle-mounted charger till the time that the H bridge is controlled by the second manner B reaches Tn, then the H bridge is switched to be controlled by using the first manner A till the time that the H bridge is controlled by the first manner A reaches Tm, thereby finishing one discharging cycle (i.e., the time of one discharging cycle equals to Tm+Tn); then the H bridge is switched to be controlled by using the second manner B to enable to discharge from the power battery via the vehicle-mounted charger till the time that the H bridge is controlled by using the second manner B reaches Tn, then the H bridge is switched to be controlled by using the first manner A to enable to discharge from the power battery via the vehicle-mounted charger till the time that the H bridge is controlled by using the first manner A reaches Tm, . . . , and the like, thereby realizing the alternative control over the H bridge, and further performing the temperature balanced control over the first switch transistor, the second switch transistor, the third switch transistor and the fourth switch transistor.

After the manner is selected during each discharging cycle, the H bridge is controlled to discharge from the power battery according to a fixed manner, i.e., the first or second manner, the total discharging time is recorded when the manner is switched, for example, when the H bridge is firstly controlled by using the first manner, the first total discharging time is recorded in this manner switching, and then the first total discharging time is obtained from the storage region when this discharging starts plus the discharging time recorded in the discharging cycle of this time.

In one embodiment of the present disclosure, the first discharging predetermined time Tm that the H bridge is controlled in the first manner A is equal to the second discharging predetermined time Tn that the H bridge is controlled in the second manner B, thereby precisely controlling heating of the first switch transistor T1, the second switch transistor T2, the third switch transistor T3 and the fourth switch transistor T4 to be relatively balanced.

Figure 8:
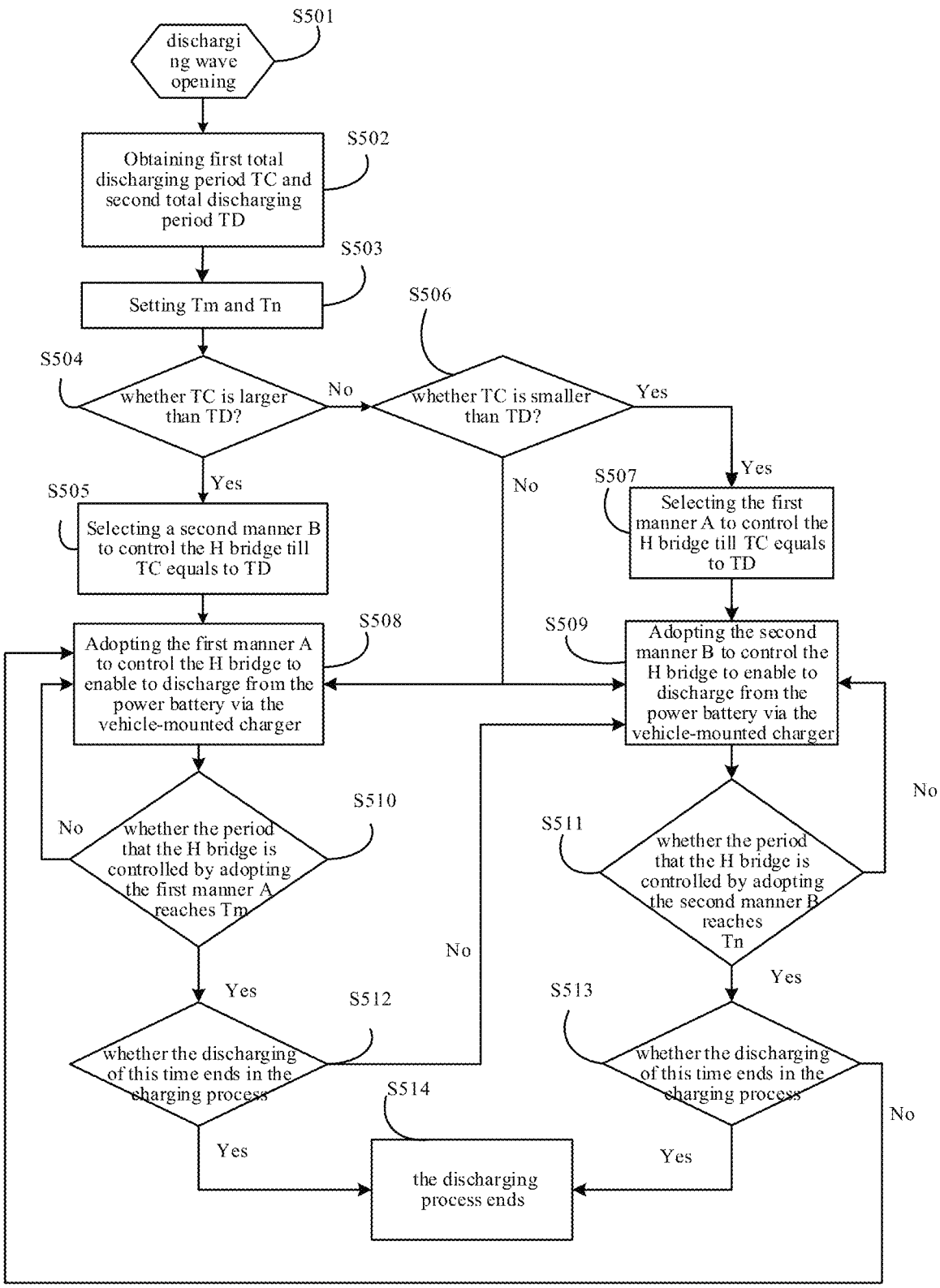
FIG. 8 is a control flow chart when a power battery discharges via a vehicle-mounted charger according to a specific embodiment of the present disclosure.

According to one embodiment of the present disclosure, as shown in FIG. 8, the method for controlling a vehicle-mounted charger of an electric vehicle includes the followings.

At step S501, a discharging wave is opened, i.e., when the power battery discharges via the vehicle-mounted charger, a control waveform needs to be output to control the switch transistors in the H bridge.

At step S502, a first total discharging time TC in the first manner A and a second total discharging time TD in the second manner B are obtained.

At step S503, a first discharging predetermined time Tm and a second discharging predetermined time Tn are set.

At step S504, it is determined whether the first total discharging time TC is larger than the second total discharging time TD. If yes, step S505 is executed, and if not, step S506 is executed.

At step S505, the second manner B is selected to control the H bridge till the first total discharging time TC is equal to the second total discharging time TD, then step S508 is executed.

At step S506, it is determined whether the first total discharging time TC is smaller than the second total discharging time TD. If yes, step S507 is executed and if not, step S508 or step S509 is executed.

At step S507, the first manner A is selected to control the H bridge till the first total discharging time TC is equal to the second total discharging time TD, then step S509 is executed.

At step S508, the first manner A is adopted to control the H bridge to enable to discharge from the power battery via the vehicle-mounted charger, then step S510 is executed.

At step S509, the second manner B is adopted to control the H bridge to enable to discharge from the power battery via the vehicle-mounted charger, then step S511 is executed.

At step S510, it is determined whether the time that the H bridge is controlled by using the first manner A reaches Tm. If yes, step S512 is executed, and if not, it is returned to step S508.

At step S511, it is determined whether the time that the H bridge is controlled by using the second manner B reaches Tn. If yes, step S513 is executed, and if not, it is returned to step S509.

At step S512, it is determined whether the discharging of this time ends during the discharging process. If yes, step S514 is executed and if not, it is returned to continue to determine in step 509

At step S513, it is determined whether the discharging of this time ends during the discharging process. If yes, step S514 is executed and if not, it is returned to continue to determine in step 508.

At step S514, the discharging process ends.

Therefore, according to the method for controlling a vehicle-mounted charger of an electric vehicle, every time in the process that the power battery discharges via the vehicle-mounted charger, the heating of the first switch transistor, the second switch transistor, the third switch transistor and the fourth switch transistor is enabled to be relative balanced, and the service life of the vehicle-mounted charger is prolonged.

According to the method for controlling a vehicle-mounted charger of an electric vehicle in embodiments of the present disclosure, every time when the power battery discharges via the vehicle-mounted charger, the first total discharging time for controlling the H bridge in the first manner and the second total discharging time for controlling the H bridge in the second manner are obtained, and the first discharging predetermined time for controlling the H bridge in the first manner and the second discharging predetermined time for controlling the H bridge in the second manner are also obtained; and the manner from the first manner and the second manner for controlling the H bridge is selected according to the relation between the first total discharging time and the second total discharging time when the power battery discharges via the vehicle-mounted charger; finally, the alternate control on the H bridge in the first manner or the second manner is performed according to the first discharging predetermined time and the second discharging predetermined time, so as to perform the temperature balanced control over the first switch transistor, the second switch transistor, the third switch transistor and the fourth switch transistor, such that the heating of each switch transistor is relatively balanced, the service life of the switch transistors in the H bridge is prolonged, and thus the service time is prolonged.

As shown in FIGS. 1 to 3, a vehicle-mounted charger according to embodiments of the present disclosure includes an H bridge and a controller such as an MCU (Micro Control Unit). The H bridge includes a first switch transistor T1, a second switch transistor T2, a third switch transistor T3 and a fourth switch transistor T4. The controller is configured to obtain a first total discharging time TC for controlling the H bridge in a first manner, and a second total discharging time TD for controlling the H bridge in a second manner when the power battery discharges via the vehicle-mounted charger; to obtain a first discharging predetermined time Tm for controlling the H bridge in the first manner and a second discharging predetermined time Tn for controlling the H bridge in the second manner; to select a manner for controlling the H bridge according to a relation between the first total discharging time TC and the second total discharging time TD; and to perform an alternate control on the H bridge in the first manner or the second manner according to the first discharging predetermined time Tm and the second discharging predetermined time Tn to perform temperature balanced control over the first switch transistor, the second switch transistor, the third switch transistor and the fourth switch transistor, in which the first discharging predetermined time Tm and the second discharging predetermined time Tn are preset for each discharging cycle of a discharging process of the power battery.

For example, in an embodiment of the present disclosure, the controller is configured to control the H bridge in the first manner A, such that when the power battery discharges via the vehicle-mounted charger, the time that the H bridge is controlled in the first manner A is recorded, thus the first total discharging time TC of controlling the H bridge in the first manner A is obtained, and then is stored; the controller is configured to control the H bridge in the second manner B, such that when the power battery discharges via the vehicle-mounted charger, the time that the H bridge is controlled in the second manner B is recorded, thus the second total discharging time TD of controlling the H bridge in the second manner B is obtained, and then is stored. Then, in the process of discharging from the power battery via the vehicle-mounted charger, the controller determines the relation between the first total discharging time TC and the second total discharging time TD every time. Finally, the manner of controlling the H bridge is selected according to the relation between the first total discharging time TC and the second total discharging time TD when the power battery discharges via the vehicle-mounted charger, thereby realizing the temperature balanced control over the first switch transistor, the second switch transistor, the third switch transistor and the fourth switch transistor.

According to an embodiment of the present disclosure, the controller is configured to select the manner from the first manner and the second manner for controlling the H bridge according to the relation between the first total discharging time TC and the second total discharging time TD; and control the H bridge in the selected manner, until the first total discharging time TC is equal to the second total discharging time TD.

According to an embodiment of the present disclosure, the controller is configured to select the manner of controlling the H bridge according to the relation between the first total discharging time TC and the second total discharging time TD by steps of: if the first total discharging time TC is larger than the second total discharging time TD, the second manner B for controlling the H bridge is selected when the power battery discharges via the vehicle-mounted charger, and then the H bridge is controlled in the second manner B until the first total discharging time TC is equal to the second total discharging time TD, and then the alternate control is performed on the H bridge according to the first discharging predetermined time Tm and the second discharging predetermined time Tn; if the second total discharging time TD is larger than the first total discharging time TC, the first manner A for controlling the H bridge is selected when the power battery discharges via the vehicle-mounted charger, and then the H bridge is controlled in the first manner A until the first total discharging time TC is equal to the second total discharging time TD, and then the alternate control is performed on the H bridge according to the first discharging predetermined time Tm and the second discharging predetermined time Tn; and if the first total discharging time TC is equal to the second total discharging time TD, the first manner A or second manner B for controlling the H bridge is selected when the power battery discharges via the vehicle-mounted charger, and then the alternate control is performed on the H bridge according to the first discharging predetermined time Tm and the second discharging predetermined time Tn when the power battery discharges via the vehicle-mounted charger.

The controller is configured to perform the alternate control on the H bridge according to the first discharging predetermined time Tm and the second discharging predetermined time Tn when the power battery discharges via the vehicle-mounted charger by steps of: when a time of controlling the H bridge in the first manner A reaches the first discharging predetermined time Tm, controlling the H bridge in the second manner B till a time of controlling the H bridge in the second manner B reaches the second discharging predetermined time Tn; or when a time of controlling the H bridge in the second manner B reaches the second discharging predetermined time Tn, controlling the H bridge in the first manner A till a time of controlling the H bridge in the first manner A reaches the first discharging predetermined time Tm.

For example, before the power battery discharges via the vehicle-mounted charger, the first total discharging time TC that the H bridge is controlled in the first manner A as well as the second total discharging time TD that the H bridge is controlled in the second manner B are obtained from a storage region. And the first discharging predetermined time Tm and the second discharging predetermined time Tn are preset. Then the relation between the first total discharging time TC and the second total discharging time TD is determined, the first manner A for controlling the H bridge firstly or the second manner B for controlling the H bridge firstly is determined according the relation. In other words, the first total discharging time TC and the second total discharging time TD are obtained from the storage region, an aim to determine the relation between the first total discharging time TC and the second total discharging time TD is to determine the selected manner for controlling the H bridge firstly when the power battery discharges via the vehicle-mounted charger.

For example, if the obtained time TC is 20 minutes and the obtained time TD is 18 minutes, when the power battery discharges via the vehicle-mounted charger, firstly the H bridge is controlled by selecting the second manner B because the obtained time TC is greater than the obtained time TD, so as to enable to discharge from the power battery via the vehicle-mounted charger. After 2 minutes, the H bridge is switched to be controlled by using the first manner A, so as to discharge from the power battery via the vehicle-mounted charger till the time that the H bridge is controlled in the first manner A reaches Tm, then the H bridge is switched to be controlled by using the second manner B till the time that the H bridge is controlled in the second manner B reaches Tn, thereby finishing one discharging cycle (i.e., the time of one discharging cycle equals to Tm+Tn); then the H bridge is switched to be controlled by using the first manner A to enable to discharge from the power battery via the vehicle-mounted charger till the time that the H bridge is controlled by using the first manner A reaches Tm, then the H bridge is switched to be controlled by using the second manner B to enable to discharge from the power battery via the vehicle-mounted charger till the time that the H bridge is controlled by using the second manner B reaches Tn, . . . , and the like, thereby realizing the alternative control over the H bridge, and further performing the temperature balanced control over the first switch transistor, the second switch transistor, the third switch transistor and the fourth switch transistor.

If the obtained time TC is 18 minutes and the obtained time TD is 20 minutes, when the power battery discharges via the vehicle-mounted charger, firstly the H bridge is controlled by selecting the first manner A because the obtained time TD is greater than the obtained time TC, so as to enable to discharge from the power battery via the vehicle-mounted charger. After 2 minutes, the H bridge is switched to be controlled by using the second manner B, so as to discharge from the power battery via the vehicle-mounted charger till the time that the H bridge is controlled by the second manner B reaches Tn, then the H bridge is switched to be controlled by using the first manner A till the time that the H bridge is controlled by the first manner A reaches Tm, thereby finishing one discharging cycle (i.e., the time of one discharging cycle equals to Tm+Tn); then the H bridge is switched to be controlled by using the second manner B to enable to discharge from the power battery via the vehicle-mounted charger till the time that the H bridge is controlled by using the second manner B reaches Tn, then the H bridge is switched to be controlled by using the first manner A to enable to discharge from the power battery via the vehicle-mounted charger till the time that the H bridge is controlled by using the first manner A reaches Tm, . . . , and the like, thereby realizing the alternative control over the H bridge, and further performing the temperature balanced control over the first switch transistor, the second switch transistor, the third switch transistor and the fourth switch transistor.

Furthermore, if the obtained time TC is equal to the obtained time TD, when the power battery discharges via the vehicle-mounted charger, firstly the H bridge can be controlled by selecting the first manner A to enable to discharge from the power battery via the vehicle-mounted charger till the time that the H bridge is controlled in the first manner A reaches Tm, then the H bridge is switched to be controlled by using the second manner B till the time that the H bridge is controlled in the second manner B reaches Tn, thereby finishing one discharging cycle (i.e., the time of one discharging cycle equals to Tm+Tn); then the H bridge is switched to be controlled by using the first manner A to enable to discharge from the power battery via the vehicle-mounted charger till the time that the H bridge is controlled by using the first manner A reaches Tm, then the H bridge is switched to be controlled by using the second manner B to enable to discharge from the power battery via the vehicle-mounted charger till the time that the H bridge is controlled by using the second manner B reaches Tn, . . . , and the like, thereby realizing the alternative control over the H bridge, and further performing the temperature balanced control over the first switch transistor, the second switch transistor, the third switch transistor and the fourth switch transistor. Or, if the obtained TC is equal to the obtained TD, when the power battery discharges via the vehicle-mounted charger, firstly the H bridge can be controlled by selecting the second manner B to enable to discharge from the power battery via the vehicle-mounted charger till the time that the H bridge is controlled by the second manner B reaches Tn, then the H bridge is switched to be controlled by using the first manner A till the time that the H bridge is controlled by the first manner A reaches Tm, thereby finishing one discharging cycle (i.e., the time of one discharging cycle equals to Tm+Tn); then the H bridge is switched to be controlled by using the second manner B to enable to discharge from the power battery via the vehicle-mounted charger till the time that the H bridge is controlled by using the second manner B reaches Tn, then the H bridge is switched to be controlled by using the first manner A to enable to discharge from the power battery via the vehicle-mounted charger till the time that the H bridge is controlled by using the first manner A reaches Tm, . . . , and the like, thereby realizing the alternative control over the H bridge, and further performing the temperature balanced control over the first switch transistor, the second switch transistor, the third switch transistor and the fourth switch transistor.

In an embodiment of the present disclosure, the first discharging predetermined time Tm that the H bridge is controlled in the first manner A equals to the second discharging predetermined time Tn that the H bridge is controlled in the second manner B.

According to an embodiment of the present disclosure, if the controller is configured to control the H bridge in the first manner A to discharge from the power battery, and when an outwardly discharging transient voltage value of the vehicle-mounted charger, the first switch transistor T1 is controlled to be ON, the second switch transistor T2 is controlled to be OFF, and the third switch transistor T3 and the fourth switch transistor T4 are controlled to be ON and OFF complementarily and alternately. When the third switch transistor T3 and the fourth switch transistor T4 are controlled to be ON and OFF alternately and complementarily, the PWM waveform of the third switch transistor T3 and the PWM waveform of the fourth switch transistor T4 are controlled to be complementary with each other, and a duty ratio of the PWM waveform of the third switch transistor T3 is controlled from large to small and then to large, and a duty ratio of the PWM waveform of the fourth switch transistor T4 is controlled from small to large and then to small; when the outwardly discharging transient voltage value of the vehicle-mounted charger is smaller than 0, the third switch transistor T3 is controlled to be ON, the fourth switch transistor T4 is controlled to be OFF, and the first switch transistor T1 and the second switch transistor T2 are controlled to be ON and OFF complementarily and alternately. When the first switch transistor T1 and the second switch transistor T2 are controlled to be ON and OFF alternately and complementarily, the PWM waveform of the first switch transistor T1 and the PWM waveform of the second switch transistor T2 are controlled to be complementary with each other, and a duty ratio of the PWM waveform of the first switch transistor T1 is controlled from large to small and then to large, and a duty ratio of the PWM waveform of the second switch transistor T2 is controlled from small to large and then to small.

According to an embodiment of the present disclosure, when the controller is configured to control the H bridge in the second manner B, and when an outwardly discharging transient voltage value of the vehicle-mounted charger is larger than 0, the second switch transistor T2 is controlled to be ON, the first switch transistor T1 is controlled to be OFF, and the third switch transistor T3 and the fourth switch transistor T4 are controlled to be ON and OFF complementarily and alternately. When the third switch transistor T3 and the fourth switch transistor T4 are controlled to be ON and OFF alternately and complementarily, the PWM waveform of the third switch transistor T3 and the PWM waveform of the fourth switch transistor T4 are controlled to be complementary with each other, and a duty ratio of the PWM waveform of the third switch transistor T3 is controlled from small to large and then to small, and a duty ratio of the PWM waveform of the fourth switch transistor T4 is controlled from large to small and then to large; when the outwardly discharging transient voltage value of the vehicle-mounted charger is smaller than 0, the fourth switch transistor T4 is controlled to be ON, the third switch transistor T3 is controlled to be OFF, and the first switch transistor T1 and the second switch transistor T2 are controlled to be ON and OFF complementarily and alternately. When the first switch transistor T1 and the second switch transistor T2 are controlled to be ON and OFF alternately and complementarily, the PWM waveform of the first switch transistor T1 and the PWM waveform of the second switch transistor T2 are controlled to be complementary with each other, and a duty ratio of the PWM waveform of the first switch transistor T1 is controlled from small to large and then to small, and a duty ratio of the PWM waveform of the second switch transistor T2 is controlled from large to small and then to large.

In an embodiment of the present disclosure, as shown in FIG. 1 or FIG. 2 or FIG. 3, the first switch transistor T1, the second switch transistor T2, the third switch transistor T3 and the fourth switch transistor T4 are all IGBTs (Insulated Gate Bipolar Transistors), certainly, in other embodiments of the present disclosure, the first switch transistor T1, the second switch transistor T2, the third switch transistor T3 and the fourth switch transistor T4 can also be MOSs (Metal Oxide Semiconductors).

In an embodiment, the first discharging predetermined time Tm and the second discharging predetermined time Tn are preset for each discharging cycle of a discharging process of the power battery, so as to perform the temperature balanced control over the first switch transistor, the second switch transistor, the third switch transistor and the fourth switch transistor.

According to the vehicle-mounted charger of an electric vehicle in embodiments of the present disclosure, every time when the power battery discharges via the vehicle-mounted charger, the controller is configured to obtain the first total discharging time for controlling the H bridge in the first manner and the second total discharging time for controlling the H bridge in the second manner, to obtain the first discharging predetermined time for controlling the H bridge in the first manner and the second discharging predetermined time for controlling the H bridge in the second manner; and to select the manner from the first manner and the second manner for controlling the H bridge according to the relation between the first total discharging time and the second total discharging time, finally, to perform the alternate control on the H bridge in the first manner or the second manner according to the first discharging predetermined time and the second discharging predetermined time, so as to perform temperature balanced control over the first switch transistor, the second switch transistor, the third switch transistor and the fourth switch transistor, such that the heating of each switch transistor is relatively balanced, the service life of the switch transistors in the H bridge is prolonged, and thus the service time is prolonged.

In addition, embodiments of the present disclosure also provide an electric vehicle, including the above vehicle-mounted charger of an electric vehicle.

According to the electric vehicle in embodiments of the present disclosure, when the power battery discharges via the vehicle-mounted charger, the temperature balanced control over the first switch transistor, the second switch transistor, the third switch transistor and the fourth switch transistor in the H bridge can be realized, such that the heating of each switch transistor is balanced, the service life of the switch transistors in the H bridge is prolonged, and thus the service time of the vehicle-mounted charger is prolonged.

In the description of the present disclosure, it is understandable that the directions of position relations indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "peripheral" are based on the directions or position relations as shown in the drawings, are merely convenient for describing the present disclosure and simplifying the description rather than indicating or implying the fact that devices or elements must have specific directions, or configured or operated in specific directions, and thus cannot understood as a limitation to the present disclosure.

In addition, the terms "first" and "second" merely aim to describe rather than being understood as indication or implication of relative importance or impliedly indicating a number of the indicated technical features. Therefore, the characteristics defined by "first" and "second" can clearly or impliedly comprise at least one such characteristic. In the description of the present disclosure, "more" means at least two, for example, two, three, etc., unless otherwise clearly specifically defined.

In the present disclosure, unless otherwise clearly specified and defined, the terms "mounted", "jointed", "connected", "fixed", etc., should be generalized understood, for example, the "connected" can be fixedly connected, or detachably connected, or integrated, can be mechanically connected or electrically connected, can also be directly connected or connected by an intermediate medium, and can also be internally communicated of two elements, or interacted of two elements, unless otherwise clearly defined. Those ordinary skilled in the art can understand the specific meaning of the terms in the present disclosure according to specific conditions.

In the present disclosure, unless otherwise clearly specified and defined, the case that a first characteristic is "on" or "under" a second characteristic can be the case that the first characteristic and the second characteristic are in direct contact, or in indirect contact by an intermediate medium. Besides, the case that the first characteristic is "on", "above" and "over" the second characteristic can be the case that the first characteristic is right or obliquely above the second characteristic, or only represents that the horizontal height of the first characteristic is higher than that of the second characteristic. The case that the first characteristic is "under", "below" and "beneath" the second characteristic can be the case that the first characteristic is right or obliquely below the second characteristic, or only represents that the horizontal height of the first characteristic is lower than that of the second characteristic.

In the description of the specification, the description of the reference terms "one embodiment", "some embodiments", "examples", "specific examples" or "some examples" refers to the fact that the specific characteristic, structure, material or feature described in combination with the embodiment or example is contained in the at least one embodiment or example of the present disclosure. In the present specification, and the schematic expression of the above terms unnecessarily aims at the same embodiment or example. In addition, the described specific characteristic, structure, material or feature can be combined in a proper manner in any one or more embodiments or examples. Besides, in the case without mutual contradiction, those skilled in the art can integrate or combine different embodiments or examples or the characteristics of different embodiments or examples described in the present specification.

Although the embodiments of the present disclosure have been shown and described as above, it is understandable that those ordinary skilled in the art can change, modify, substitute and transform the above embodiments in a scope of the present disclosure.

What is claimed is:

1. A method for controlling a vehicle-mounted charger of an electric vehicle, comprising:
    obtaining a first total discharging time (TC) for controlling an H bridge of the vehicle-mounted charger in a first manner and a second total discharging time (TD) for controlling the H bridge in a second manner when a power battery starts to discharge via the vehicle-mounted charger;
    obtaining a first discharging predetermined time (Tm) for controlling the H bridge in the first manner and a second discharging predetermined time (Tn) for controlling the H bridge in the second manner;
    selecting a manner for controlling the H bridge according to a relation between the first total discharging time (TC) and the second total discharging time (TD); and
    performing an alternate control on the H bridge in the first manner or the second manner according to the first discharging predetermined time (Tm) and the second discharging predetermined time (Tn) to perform temperature balanced control over a first switch transistor, a second switch transistor, a third switch transistor and a fourth switch transistor, in the H bridge,
    wherein the first discharging predetermined time (Tm) and the second discharging predetermined time (Tn) are preset for each discharging cycle of a discharging process of the power battery.

2. The method according to claim 1, wherein selecting the manner for controlling the H bridge according to a relation between the first total discharging time (TC) and the second total discharging time (TD) comprises:
    selecting the manner from the first manner and the second manner for controlling the H bridge according to the relation between the first total discharging time (TC) and the second total discharging time (TD); and
    controlling the H bridge in the selected manner, until the first total discharging time (TC) is equal to the second total discharging time (TD).

3. The method according to claim 1 or 2, wherein selecting the manner from the first manner and the second manner for controlling the H bridge according to the relation between the first total discharging time (TC) and the second total discharging time (TD) comprises:
    selecting the second manner for controlling the H bridge when the first total discharging time (TC) is larger than the second total discharging time (TD);
    selecting the first manner for controlling the H bridge when the first total discharging time (TC) is less than the second total discharging time (TD); and
    selecting the first manner for controlling the H bridge when the first total discharging time (TC) is equal to the second total discharging time (TD).

4. The method according to claim 3, wherein controlling the H bridge in the first manner comprises:
    when an outwardly discharging transient voltage value of the vehicle-mounted charger is larger than 0, controlling the first switch transistor to be ON, controlling the second switch transistor to be OFF, and controlling the third switch transistor and the fourth switch transistor to be ON and OFF alternately and complementarily; and
    when the outwardly discharging transient voltage value of the vehicle-mounted charger is smaller than 0, controlling the third switch transistor to be ON, controlling the fourth switch transistor to be OFF, and controlling the first switch transistor and the second switch transistor to be ON and OFF alternately and complementarily.

5. The method according to claim 3, wherein controlling the H bridge in the second manner comprises:
    when an outwardly discharging transient voltage value of the vehicle-mounted charger is larger than 0, controlling the second switch transistor to be ON, controlling the first switch transistor to be OFF, and controlling the third switch transistor and the fourth switch transistor to be ON and OFF alternately and complementarily; and when the outwardly discharging transient voltage value of the vehicle-mounted charger is smaller than 0, controlling the fourth switch transistor to be ON, controlling the third switch transistor to be OFF, and controlling the first switch transistor and the second switch transistor to be ON and OFF alternately and complementarily.

6. The method according to claim 5, wherein performing the alternate control on the H bridge in the first manner or the second manner according to the first discharging predetermined time (Tm) and the second discharging predetermined time (Tn) comprises:

controlling the H bridge in the first manner until a time of controlling the H bridge in the first manner reaches the first discharging predetermined time (Tm) and controlling the H bridge in the second manner until a time of controlling the H bridge in the second manner reaches the second discharging predetermined time (Tn); or controlling the H bridge in the second manner until a time of controlling the H bridge in the second manner reaches the second discharging predetermined time (Tn) and controlling the H bridge in the first manner until a time of controlling the H bridge in the first manner reaches the first discharging predetermined time (Tm).

7. The method according to claim 6, wherein the first discharging predetermined time (Tm) is equal to the second discharging predetermined time (Tn).

8. A vehicle-mounted charger of an electric vehicle, comprising:

an H bridge, comprising a first switch transistor, a second switch transistor, a third switch transistor and a fourth switch transistor; and a controller, configured to obtain a first total discharging time (TC) for controlling the H bridge in a first manner and a second total discharging time (TD) for controlling the H bridge in a second manner when a power battery starts to discharge via the vehicle-mounted charger; to obtain a first discharging predetermined time (Tm) for controlling the H bridge in the first manner and a second discharging predetermined time (Tn) for controlling the H bridge in the second manner; to select a manner for controlling the H bridge according to a relation between the first total discharging time (TC) and the second total discharging time (TD); and to perform an alternate control on the H bridge in the first manner or the second manner according to the first discharging predetermined time (Tm) and the second discharging predetermined time (Tn) to perform temperature balanced control over the first switch transistor, the second switch transistor, the third switch transistor and the fourth switch transistor, wherein the first discharging predetermined time (Tm) and the second discharging predetermined time (Tn) are preset for each discharging cycle of a discharging process of the power battery.

9. The vehicle-mounted charger according to claim 8, wherein the controller is configured to:

select the manner from the first manner and the second manner for controlling the H bridge according to the relation between the first total discharging time (TC) and the second total discharging time (TD); and control the H bridge in the selected manner, until the first total discharging time (TC) is equal to the second total discharging time (TD).

10. The vehicle-mounted charger according to claim 9, wherein the controller is further configured to:

select the second manner for controlling the H bridge when the first total discharging time (TC) is larger than the second total discharging time (TD);

select the first manner for controlling the H bridge when the first total discharging time (TC) is less than the second total discharging time (TD); and select the first manner for controlling the H bridge when the first total discharging time (TC) is equal to the second total discharging time (TD).

11. The vehicle-mounted charger according to claim 10, wherein the controller is further configured to:

control the first switch transistor to be ON, the second switch transistor to be OFF and the third switch transistor and the fourth switch transistor to be ON and OFF alternately and complementarily when an outwardly discharging transient voltage value of the vehicle-mounted charger is larger than 0; and control the third switch transistor to be ON, the fourth switch transistor to be OFF, and the first switch transistor and the second switch transistor to be ON and OFF alternately and complementarily when the outwardly discharging transient voltage value of the vehicle-mounted charger is smaller than 0.

12. The vehicle-mounted charger according to claim 10, wherein the controller is further configured to:

control the second switch transistor to be ON, the first switch transistor to be OFF, and the third switch transistor and the fourth switch transistor to be ON and OFF alternately and complementarily when an outwardly discharging transient voltage value of the vehicle-mounted charger is larger than 0;

control the fourth switch transistor to be ON, the third switch transistor to be OFF, and the first switch transistor and the second switch transistor to be ON and OFF alternately and complementarily when the outwardly discharging transient voltage value of the vehicle-mounted charger is smaller than 0.

13. The vehicle-mounted charger according to claim 12, wherein the controller is configured to:

control the H bridge in the first manner until a time of controlling the H bridge in the first manner reaches the first discharging predetermined time (Tm) and control the H bridge in the second manner until a time of controlling the H bridge in the second manner reaches the second discharging predetermined time (Tn); or control the H bridge in the second manner until a time of controlling the H bridge in the second manner reaches the second discharging predetermined time (Tn) and control the H bridge in the first manner until a time of controlling the H bridge in the first manner reaches the first discharging predetermined time (Tm).

14. The vehicle-mounted charger according to claim 13, wherein the first discharging predetermined time (Tm) is equal to the second discharging predetermined time (Tn).

15. An electric vehicle, comprising:

a vehicle-mounted charger, comprising:

an H bridge, comprising a first switch transistor, a second switch transistor, a third switch transistor and a fourth switch transistor; and a controller, configured to obtain a first total discharging time (TC) for controlling the H bridge in a first manner and a second total discharging time (TD) for controlling the H bridge in a second manner when a power battery starts to discharge via the vehicle-mounted charger; to obtain a first discharging predetermined time (Tm) for controlling the H bridge in the first manner and a second discharging predetermined time (Tn) for controlling the H bridge in the second manner; to select a manner for controlling the H bridge according to a relation between the first total discharging time (TC) and the second total discharging time (TD); and to perform an alternate control on the H bridge in the first manner or the second manner according to the first discharging predetermined time (Tm) and the second discharging predetermined time (Tn) to perform temperature balanced control over the first switch transistor, the second switch transistor, the third switch transistor and the fourth switch transistor, wherein the first discharging predetermined time (Tm) and the second discharging predetermined time (Tn) are preset for each discharging cycle of a discharging process of the power battery.

16. The electric vehicle according to claim 15, wherein the controller is configured to:
select the manner from the first manner and the second manner for controlling the H bridge according to the relation between the first total discharging time (TC) and the second total discharging time (TD); and
control the H bridge in the selected manner, until the first total discharging time (TC) is equal to the second total discharging time (TD).

17. The electric vehicle according to claim 15, wherein the controller is further configured to:
select the second manner for controlling the H bridge when the first total discharging time (TC) is larger than the second total discharging time (TD);
select the first manner for controlling the H bridge when the first total discharging time (TC) is less than the second total discharging time (TD); and
select the first manner for controlling the H bridge when the first total discharging time (TC) is equal to the second total discharging time (TD).

* * * * *